United States Patent
Krishnamurthy et al.

(10) Patent No.: US 8,767,708 B2
(45) Date of Patent: Jul. 1, 2014

(54) METHODS FOR CELL SEARCH IN SYNCHRONOUS INTERFERENCE LIMITED CHANNELS

(75) Inventors: Sandeep H. Krishnamurthy, Arlington Heights, IL (US); Colin D. Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 448 days.

(21) Appl. No.: 12/981,724

(22) Filed: Dec. 30, 2010

(65) Prior Publication Data

US 2012/0172041 A1  Jul. 5, 2012

(51) Int. Cl.
*H04B 1/7156* (2011.01)
*H04W 56/00* (2009.01)

(52) U.S. Cl.
CPC .................................. *H04W 56/00* (2013.01)
USPC ....................................................... 370/350

(58) Field of Classification Search
CPC ....... H04L 47/10; H04L 43/50; H04W 56/00; H04W 56/001
USPC ......... 370/241, 252, 310, 328, 329, 335, 345, 370/350, 464, 498, 503, 507; 455/39, 500, 455/501, 502
See application file for complete search history.

(56) References Cited

U.S. PATENT DOCUMENTS

| | | | |
|---|---|---|---|
| 2003/0202541 A1* | 10/2003 | Lim et al. | 370/503 |
| 2005/0075125 A1* | 4/2005 | Bada et al. | 455/525 |
| 2005/0088987 A1* | 4/2005 | Ryu | 370/328 |
| 2005/0272375 A1* | 12/2005 | Ramesh | 455/67.11 |
| 2006/0153283 A1 | 7/2006 | Scharf et al. | |
| 2008/0019350 A1* | 1/2008 | Onggosanusi et al. | 370/350 |
| 2008/0089282 A1 | 4/2008 | Malladi et al. | |
| 2008/0285433 A1 | 11/2008 | Akita et al. | |

(Continued)

FOREIGN PATENT DOCUMENTS

| | | |
|---|---|---|
| EP | 2166801 A1 | 3/2010 |
| WO | 0055992 | 9/2000 |
| WO | 2010003034 A1 | 1/2010 |
| WO | 201015399 A1 | 12/2010 |

OTHER PUBLICATIONS

Hao Cao et al: "An area-efficient implementation of Primary Synchronization Signal detection in LTE", Communication Technology (ICCT), 2010 12th IEEE International Conference On, IEEE, Piscataway, NJ, USA, Nov. 11, 2010, pp. 722-725.

(Continued)

*Primary Examiner* — Obaidul Huq

(57) ABSTRACT

The cell searcher module (CSM) of a wireless communication device detects that the device is in coverage region of an eNB by processing received signal associated with the primary synchronization (PSCH) and secondary synchronization (SSCH) sequences transmitted by the eNB. The wireless device determines whether candidate SCH signals from candidate neighbor cells are synchronous with SCH sequences from the serving cell by implementing one of three methods. In a first method, the CSM generates a joint estimate of the received power of SSCH sequences corresponding to already detected/identified serving cell and a hypothetical neighbor cell. In a second method, the CSM re-constructs SCH sequences corresponding to already detected cells and subtracts the re-constructed SCH sequences from the received signal to obtain a residual signal with reduced serving cell interference. In a third embodiment, the CSM performs a correlation of estimated channel responses to determine whether the neighbor cell is present.

20 Claims, 10 Drawing Sheets

(56) References Cited

U.S. PATENT DOCUMENTS

| | | |
|---|---|---|
| 2009/0011762 A1 | 1/2009 | Han et al. |
| 2010/0029262 A1 | 2/2010 | Wang et al. |
| 2010/0039948 A1* | 2/2010 | Agrawal et al. ............... 370/252 |
| 2010/0074199 A1* | 3/2010 | Shin et al. .................... 370/329 |
| 2010/0091826 A1* | 4/2010 | Chen et al. ................... 375/224 |
| 2011/0002221 A1* | 1/2011 | Turk et al. .................... 370/235 |
| 2011/0039565 A1* | 2/2011 | Brunel et al. ................. 455/436 |

OTHER PUBLICATIONS

Srikanth S et al: "Orthogonal frequency division multiple access in WiMAX and LTE a A comparison", Communications (NCC), 2010 National Conference On, IEEE, Piscataway, NJ, USA, Jan. 29, 2010, pp. 1-5.

Jiann-Ching Guey Y-P Eric Wang Jung-U Cheng: "Improving the Robustness of Target Cell Search in WCDMA Using Interference Cancellation", Wireless Networks, Communications and Mobile Computing, 2005 International Conference on Maui, HI, USA Jun. 13-16, 2005, Piscataway, NJ, USA,IEEE, vol. 2, Jun. 13, 2005, pp. 879-883.

Patent Cooperation Treaty, International Search Report and Written Opinion of the International Searching Authority for International Application No. PCT/US2011/066447, May 9, 2012, 20 pages.

3GPP TSG RAN WG4 #45, R4-072215 "Simulations Assumptions for Intra-frequency Cell Identification", Texas Instruments et al.; JeJu, Korea, Nov. 5-9, 2007, 3 pages.

S. Verdú, "Minimum Probability of Error for Asynchronous Gaussian Multiple Access Channels,"IEEE Trans. Information Theory, vol. IT-32, No. 1, p. 85-96, Jan. 1986.

Qualcomm Incorporated: "eICIC Broadcast channel reliability", 3GPP TSG-RAN WG4 57, R4-104150, Nov. 15-19, Jacsonville, USA, all pages.

* cited by examiner

METHODS FOR CELL SEARCH IN SYNCHRONOUS INTERFERENCE LIMITED CHANNELS

BACKGROUND

1. Technical Field

The present invention generally relates to wireless communication systems and in particular to identification of neighbor cells in wireless communication systems.

2. Description of the Related Art

Many frequency division duplex (FDD) networks deployments implementing the Universal Mobile Telecommunications System (UMTS) Terrestrial Radio Access (E-UTRA) standard can be synchronous and all time division duplex (TDD) deployments are expected to be synchronous. In a synchronous network, the Evolved Universal Terrestrial Radio Access Network Node Bs (eNodeBs) are aligned in symbol timing and radio-frame timing within a tolerance of the order of few microseconds (e.g., TS 36.133 requirement is +/−3 us for TDD operation). The primary synchronization channel (P-SCH or PSCH) and secondary synchronization channel (S-SCH or SSCH), which are transmitted by neighboring eNodeBs in subframes #0 and #5, can interfere with each other at a user equipment (UE) receiver for FDD (and similarly subframes pairs (#0, #1) and (#5, #6) for TDD). TS 36.211 defines 3 PSCH sequences and 168 SSCH sequences for each PSCH sequence to provide a total of 3*168=504 physical cell identities (PCID).

Network deployments where two neighbor eNodeBs on the same carrier end up with the same PSCH sequence is expected to be common since there are only three PSCH sequences. In principle, in one or two consecutive subframes over which PSCH and SSCH are transmitted, the propagation channel can be assumed to remain substantially unchanged between the two channels, and the PSCH may be used to obtain the channel reference for processing SSCH. However, in a synchronous deployment, for example, the serving cell signal strength may be strong enough to prevent the UE from being able to detect a neighbor/interferer cell with the same PSCH sequence as the serving cell. This is because, when the serving cell signal strength dominates at the UE receiver, if the UE tries to use PSCH sequence to estimate the channel reference, the UE ends up estimating the propagation channel from the serving cell rather than estimating the propagation channel from the neighbor cell. This (corrupted) channel estimate often leads to failure in identifying a newly detectable neighbor cell.

BRIEF DESCRIPTION OF THE DRAWINGS

The embodiments described herein will best be understood by reference to the following detailed description of illustrative embodiments when read in conjunction with the accompanying drawings, wherein.

DETAILED DESCRIPTION OF ILLUSTRATIVE EMBODIMENTS

Figure 1:
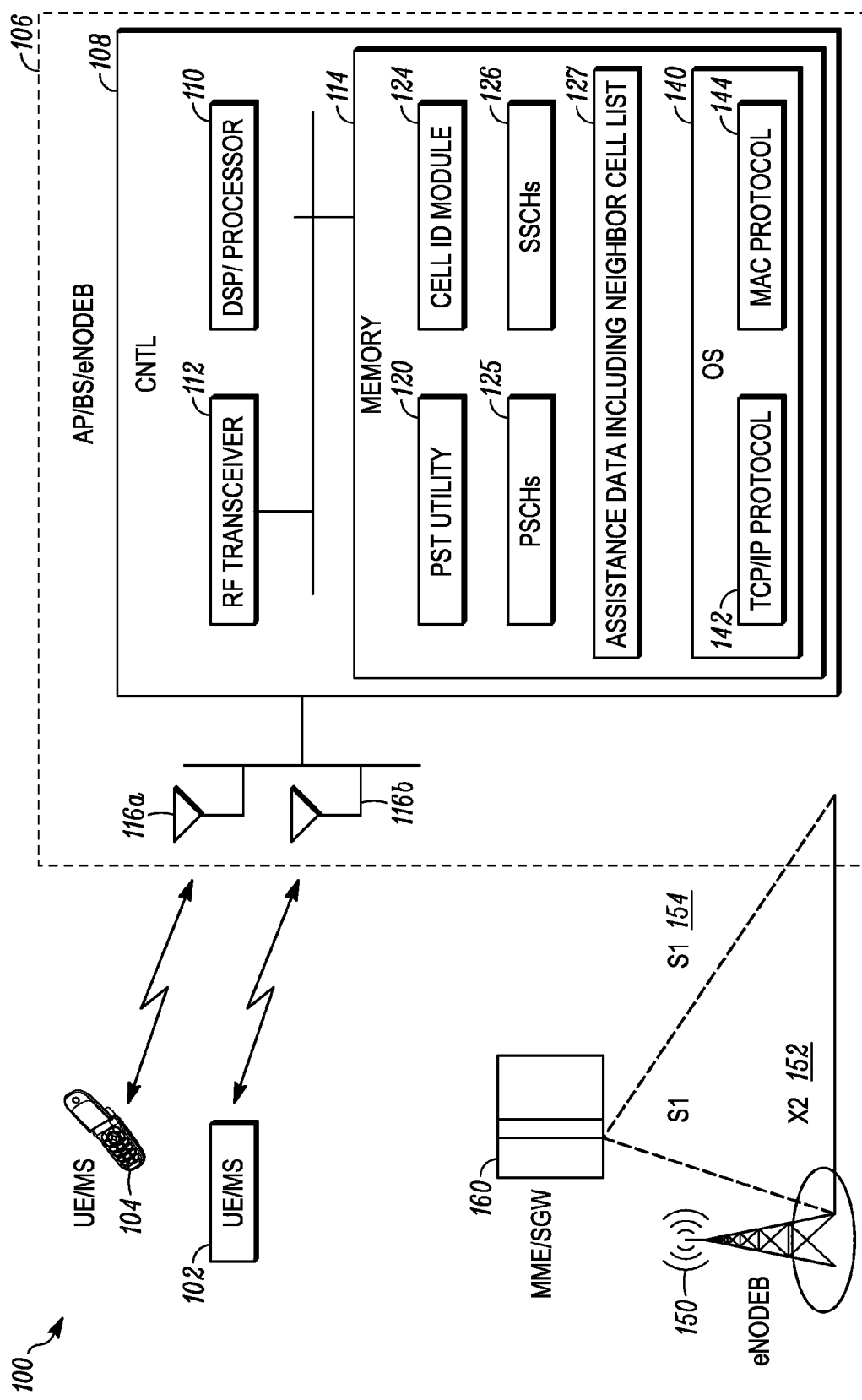
FIG. 1 illustrates a Long Term Evolution (LTE) configured wireless communication system including a block diagram representation of a base-station (BS)/eNodeB, according to one embodiment.

The illustrative embodiments provide a method, system, and mobile wireless device for identifying neighbor cells in a Long Term Evolution (LTE) configured wireless communication system. The cell searcher module (CSM) residing in the receiver of the wireless device detects that the device is in the coverage region of an Evolved Universal Terrestrial Radio Access Network Node B (eNodeB or eNB) by processing the receive signal associated with the primary synchronization (PSCH) and secondary synchronization (SSCH) sequences transmitted by an eNB. The wireless device determines whether candidate SCH signals (i.e., one or both of PSCH and SSCH sequences) from candidate neighbor/interferer cells are coherent and/or are synchronous with SCH sequences from the serving cell. If the serving cell and a neighbor cell are frame time aligned (i.e., synchronous), the SCH sequences transmitted from the serving cell overlap in time and frequency with the neighbor cells' SCH transmission when both cells share the same carrier. This frame time alignment of the SCH sequences results in the serving cell interfering with the detection of the neighbor cell (i.e., in intra-frequency cell identification) as typically, the serving cell is the strongest cell (when ranked by reference signal received power, RSRP).

In one embodiment, the CSM generates a joint estimate of the received power of SSCH sequences corresponding to already detected/identified serving cell and a hypothetical neighbor cell (which has not yet been detected). In a second embodiment, the CSM re-constructs one or both of the PSCH and SSCH sequences for the already detected/identified serving cell and subtracts the reconstructed signal(s) from the received signal. The subtraction operation removes the serving cell PSCH/SSCH transmission from the received signal and therefore mitigates the serving cell interference problem to a large extent. The CSM then proceeds to detect/identify the PSCH and SSCH associated with a hypothetical neighbor cell (which has not been detected yet), as if there was no interference from the serving cell.

In a third embodiment, the CSM jointly estimates the channel response associated with the known SSCH sequence of the serving cell and the SSCH sequence of a hypothetical neighbor cell (which has not been detected/identified yet). The estimated channel response ($h_0$) for the hypothetical neighbor cell is correlated against a similar channel response ($h_1$) obtained from the hypothetical neighbor cell's PSCH to determine whether the neighbor cell is present.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element can be provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to FIG. 1, a Long Term Evolution (LTE) configured wireless communication system is illustrated, according to one embodiment. In the described embodiments, wireless communication system 100 may support several standards/networks, such as third generation (3G) and fourth generation (4G) networks, which include Long Term Evolution (LTE) standard.

Wireless communication system 100 comprises a number ("L") of wireless communication devices, for example, first and second wireless devices, mobile station (MS)/user equipment (UE) 102 and MS/UE 104. One or more of the wireless communication devices may be associated with a mobile user/subscriber. Thus, in certain instances, a wireless communication device may be interchangeably referred to herein as a user device, user equipment (UE), mobile user device, mobile station (MS), subscriber or user, as a general reference to the association of the device(s) to a device user. These references are however not intended to be limiting on the applicability of the invention to devices not directly associated with individual/human users. Within the description which follows, the example wireless device is primarily referred to as MS/UE 102 or simply UE 102.

Wireless communication system 100 comprises at least one base-station (BS)/Evolved Universal Terrestrial Radio Access Network Node B (eNodeB/eNB) 106, illustrated with its various functional components in block diagram representation. In one embodiment, BS/eNodeB 106 may represent a base transceiver station (BTS), an enhanced/evolved node B (eNodeB), or a base station. BS/eNodeB 106 comprises controller (Cntl) 108. Controller 108 comprises memory 114, digital signal processor (DSP)/Processor 110 and RF transceiver 112. Although the logic of RF transceiver 112 is illustrated within controller 108, it should be appreciated that with other implementations, RF transceiver 112 may likely be positioned external to controller 108. Also, while shown as a single module/device, DSP/Processor 110 may be one or more individual components communicatively coupled to each other, and controlling different functions within Cntl 108. The wireless communication devices all connect to BS/eNodeB 106 via an antenna array comprising one or more antenna elements, of which BS antenna 116 is illustrated.

Wireless communication system 100 is further illustrated with second BS/eNodeB 150. BS/eNodeB 106 and second BS/eNodeB 150 are interconnected by means of an X2 interface (e.g., X2 152). Furthermore, BS/eNodeB 106 and second BS/eNodeB 150 are connected by means of an S1 interface (e.g., S1 154) to an evolved packet core (EPC), more specifically, to mobility management entity (MME)/serving gateway (S-GW) 160.

In addition to the above described hardware components of BS/eNodeB 106 within wireless communication system 100, various features of the invention may be completed/supported via software (or firmware) code or logic stored within memory 114 (or other storage) and executed by DSP/Processor 110. Thus, for example, illustrated within memory 114 are a number of software/firmware/logic components/modules, including operating system (OS) 140 which includes Transmission Control Protocol (TCP)/Internet Protocol (IP) module 142 and Media Access Control (MAC) protocol module 144. Memory 114 also includes cell identification module 124, PSCH sequence data 125, SSCH sequence data 126, and assistance data including a neighbor cell list 127. In addition, memory 114 comprises PSCH SSCH Transmission (PST) logic/utility 120.

During wireless communication, MS/UE 102 and MS/UE 104 wirelessly communicates with BS/eNodeB 106 via the antenna array. Furthermore, MS/UE 102, receives data from other base stations (e.g., BS/eNodeB 150) and performs neighbor cell identification using cell searcher module (CSM) 220 (illustrated in FIG. 2).

According to the described embodiments, cell identification entails at least two stages: (i) identifying the index $N_{ID,1}$ of the P-SCH that was transmitted by an eNB and (ii) identifying the index $N_{ID,2}$ associated with the S-SCH that was transmitted by an eNB. Together, these two indices are used to determine the PCID of the eNB that transmitted these P/S-SCH using the equation, $PCID=3*N_{ID,1}+N_{ID,2}$. In one embodiment, a third stage to cell identification is provided and is described as follows: (iii) after determining the PCID based on processing, PSCH and SSCH, the cell-specific reference signals (CRSs) from the eNB are processed to estimate the reference signal received power (RSRP). These stages/steps (i), (ii) and (iii) described herein respectively correspond to Stage 1, Stage 2 and Stage 3 in the cell searcher module (CSM) in UE (terminal) receivers (e.g., MS/UE 102). The output of the cell searcher module therefore includes a PCID for a detected cell, an associated RSRP measurement, and optionally the symbol/frame timing of the detected cell and the cyclic prefix (CP) length (normal or extended) associated with the eNB OFDM symbol transmission.

Figure 2:
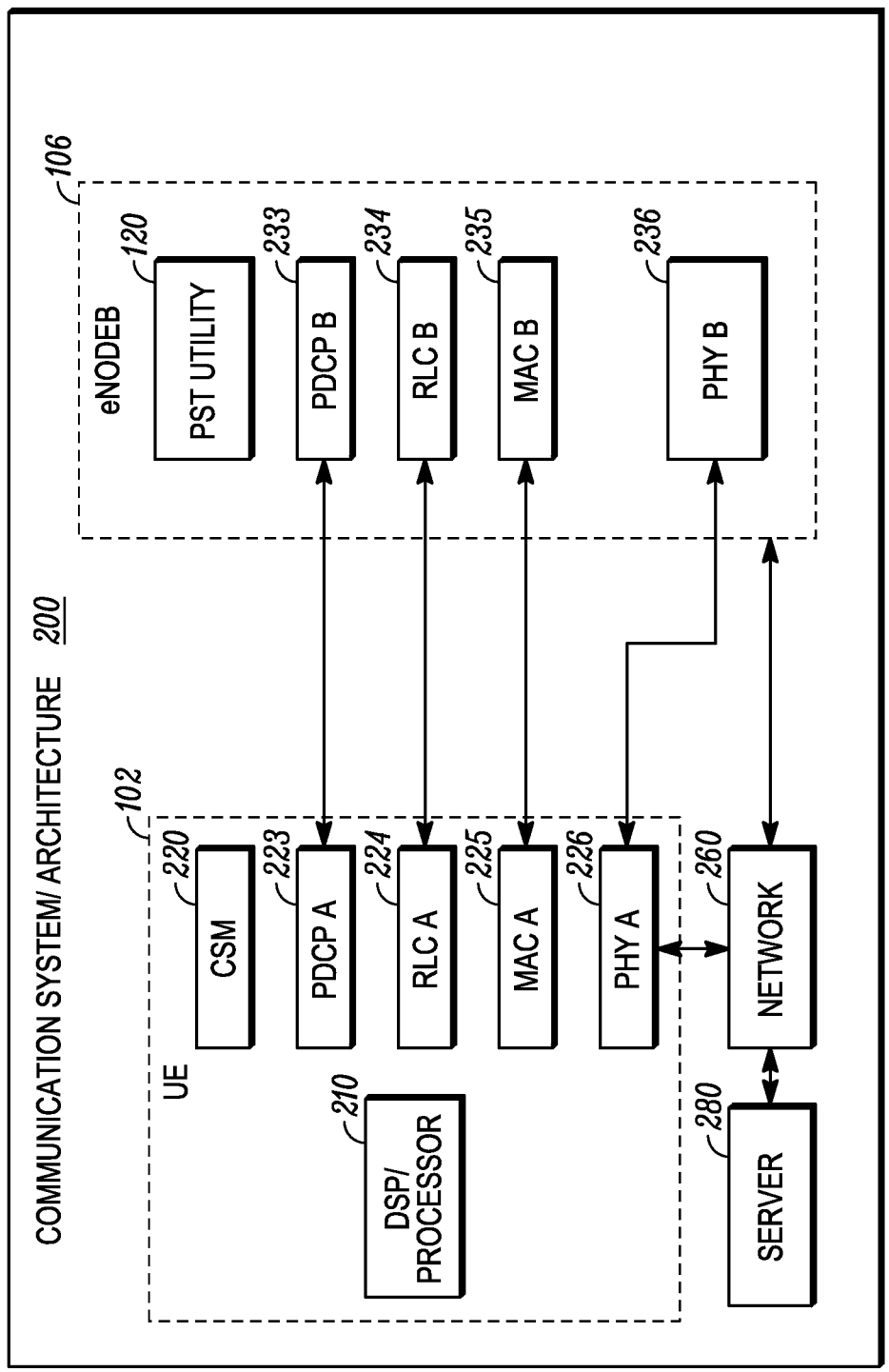
FIG. 2 provides a block diagram representation of a communication architecture for communication between user equipment (UE) and Evolved Universal Terrestrial Radio Access Network Node B (eNodeB), according to one embodiment.

With reference now to FIG. 2, there is depicted a block diagram representation of a communication architecture 200 for communication between user equipment (UE) and Evolved Universal Terrestrial Radio Access Network Node B (eNodeB). As illustrated, communication architecture 200 comprises UE 102 and eNodeB 106. UE 102 comprises cell searcher module (CSM) 220 (which executes on processor 210), packet data convergence protocol (PDCP) A 223, radio link control (RLC) A 224, medium access control (MAC) A 225, and physical layer (PHY) A 226. In communication with UE 102 is eNodeB 106. Included within eNodeB 106 are: packet data convergence protocol (PDCP) B 233, radio link control (RLC) B 234, medium access control (MAC) B 235, and physical layer (PHY) B 236. Additionally, communication system/architecture 200 includes network 260 and server 280.

In one embodiment, eNodeB 106 transmits and receives data and/or information from UE 102. PDCP A 223, RLC A 224, MAC A 225, and PHY A 226 of UE 102 enable UE 102 to communicate (e.g., configuration data) via respective connections/layers with eNodeB 106, which similarly comprises PDCP B 233, RLC B 234, MAC B 235, and PHY B 236. Network 260 also receives and transmits data to and from UE 102 and eNodeB 106. Network 260 may send and receive data/information from one or more components (not shown) via server 280. Server 280 represents a software deploying server and communicates with eNodeB 106 via network 260.

Figure 3:
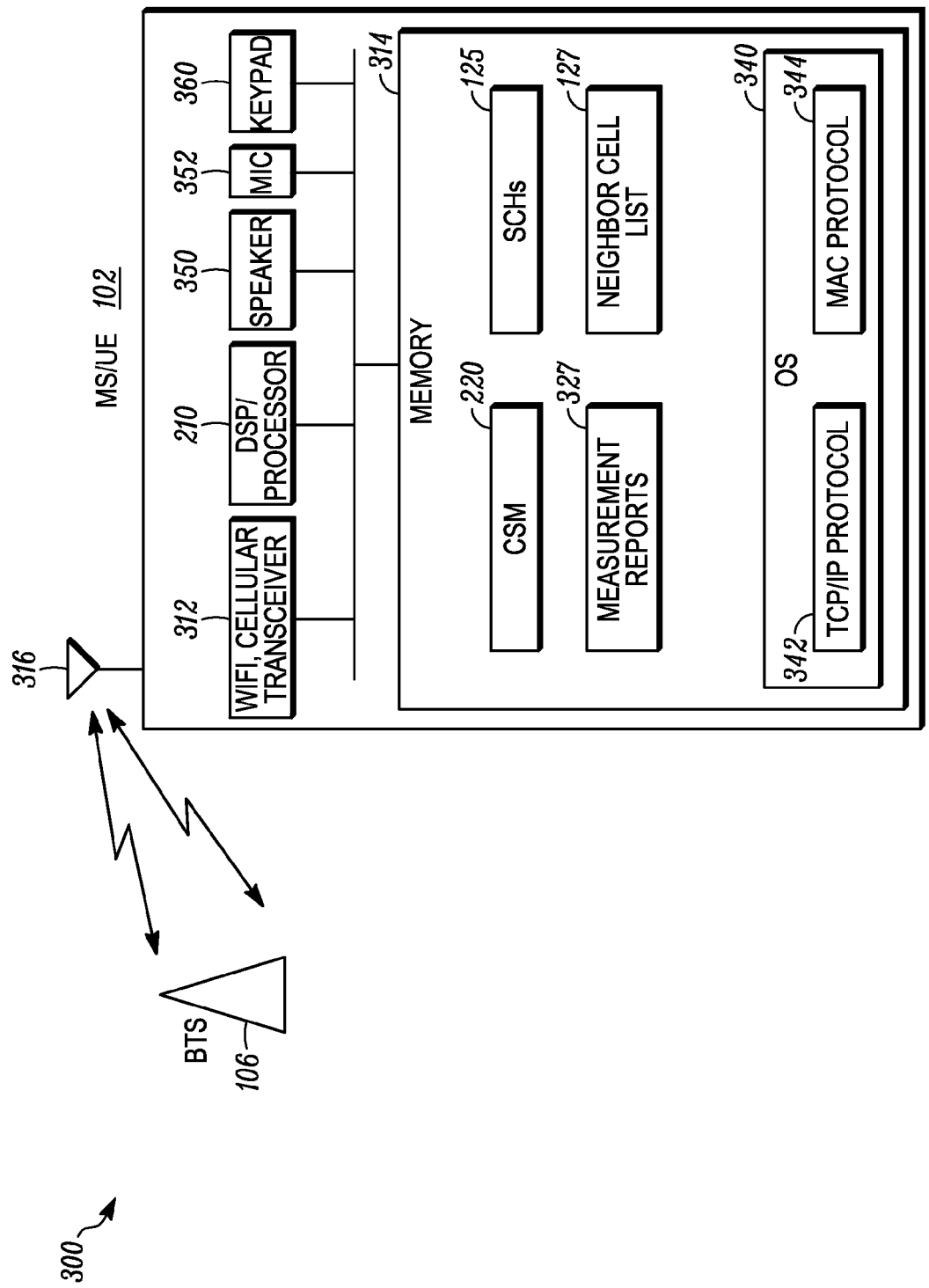
FIG. 3 illustrates basic functional components of an example wireless communications device (or MS/UE) within a wireless communications system, according to one embodiment.

FIG. 3 illustrates basic functional components of an example wireless communications device (or MS/UE) within a mobile device focus of wireless communications system 300, according to one embodiment. In one embodiment, the wireless communications device is a mobile cellular device/phone (e.g., MS/UE 102). UE 102 comprises memory 314, digital signal processor (DSP)/Processor 210 and RF transceiver 312. UE 102 connects to BTS/eNodeB 106 via an antenna illustrated as antenna 316. In addition, UE 102 comprises speaker 350, microphone 352 and keypad 360 for user level interaction with the device.

In addition to the above described hardware components of UE 102 within wireless communication system 300, various features of the invention may be completed/supported via software (or firmware) code or logic stored within memory 314 (or other storage) and executed by DSP/Processor 210. Thus, for example, illustrated within memory 314 are a number of software/firmware/logic components/modules, including mobile operating system (OS) 340 which includes Transmission Control Protocol (TCP)/Internet Protocol (IP) module 342 and Media Access Control (MAC) protocol module 344. Memory 314 also includes measurement reports 127, and neighbor lists 128. In addition, memory 314 comprises cell searcher module (CSM) 220. In the descriptions which follow, CSM 220 is illustrated and described as a stand-alone or separate software/firmware component, which provides specific functions, as described below. Specifically, in the described embodiment, CSM 220 provides certain functions that are executed by MS/UE 102 within communication architecture/system 300. Additional detail of the functionality associated with CSM 220 is presented below with reference to FIG. 3 and subsequent figures.

Those of ordinary skill in the art will appreciate that the hardware components and basic configuration depicted in FIG. 1, FIG. 2 and FIG. 3 may vary. The illustrative components within wireless communication system/architecture 100 and BS/eNodeB 106 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Certain of the functions supported and/or provided by CSM 220 are implemented via processing logic (or code) executed by processor 210 and/or other device hardware. Among the software code/instructions/logic provided by CSM 220 in various different embodiments and which enables the implementation of various different embodiments, are: (a) logic for configuring the wireless device to determine whether candidate SCH signals from candidate neighbor/interferer cells are coherent and/or synchronous with SCH sequences from the serving cell; (b) logic for receiving a signal that includes primary synchronization (PSCH) and secondary synchronization (SSCH) sequences transmitted over a propagation channel from an eNB to the wireless receiver device; (c) logic for generating a joint estimate of the received power of SSCH sequences corresponding to the already identified serving cell and a hypothetical neighbor cell (which has not yet been identified), in a first embodiment; (d) logic for removing from the received signal a reconstruction/estimation of one or both of the PSCH and SSCH sequences transmitted by the identified serving cell, in a second embodiment; (e) logic for identifying the PSCH and SSCH associated with a hypothetical neighbor cell based on minimized interference from the serving cell resulting from the removal of the reconstruction of SCH sequences from the received signal, in the second embodiment; (f) logic for generating a joint estimate of the channel response associated with the known SSCH sequence of the serving cell and the SSCH sequence of a hypothetical neighbor cell, in a third embodiment.

In the third embodiment, CSM 220 further provides software code/instructions/logic comprising: (g) logic for obtaining an estimate of the propagation channel from the primary synchronization channel corresponding to the hypothetical new cell; (h) logic for performing correlations between the joint estimate of channel response ($h_0$) obtained from the SSCH corresponding to the hypothetical new neighbor cell SSCH and the estimate of the propagation channel ($h_1$) obtained from the PSCH corresponding to the hypothetical new neighbor cell PSCH; and (i) logic for identifying a newly detectable cell according to a rank of hypothetical candidates provided via the correlation metric, in the various different embodiments. According to the illustrative embodiment, when processor 210 executes CSM 220, UE 102 initiates a series of functional processes that enable the above functional features as well as additional features/functionality. These features/functionalities are described in further detail below within the (continuing description of FIGS. 1-3 and) description of FIGS. 4-10. Three different methods are provided within the following description, with each method occasionally being referred to as a first embodiment, a second embodiment, and a third embodiment. Each method comprises multiple stages as defined within the specific presentation of that method. The embodiments assume implementation of only one method by a specific UE at any given time, although multiple of the three methods can be supported within a single UE and made available by selective activation (e.g., by programming of the device to operate in a specific manner desired by a manufacturer or commercial retailer or device engineer).

Method 1: Cell Identification with Inner Loop and Joint SCH Power Estimation

Figure 4:
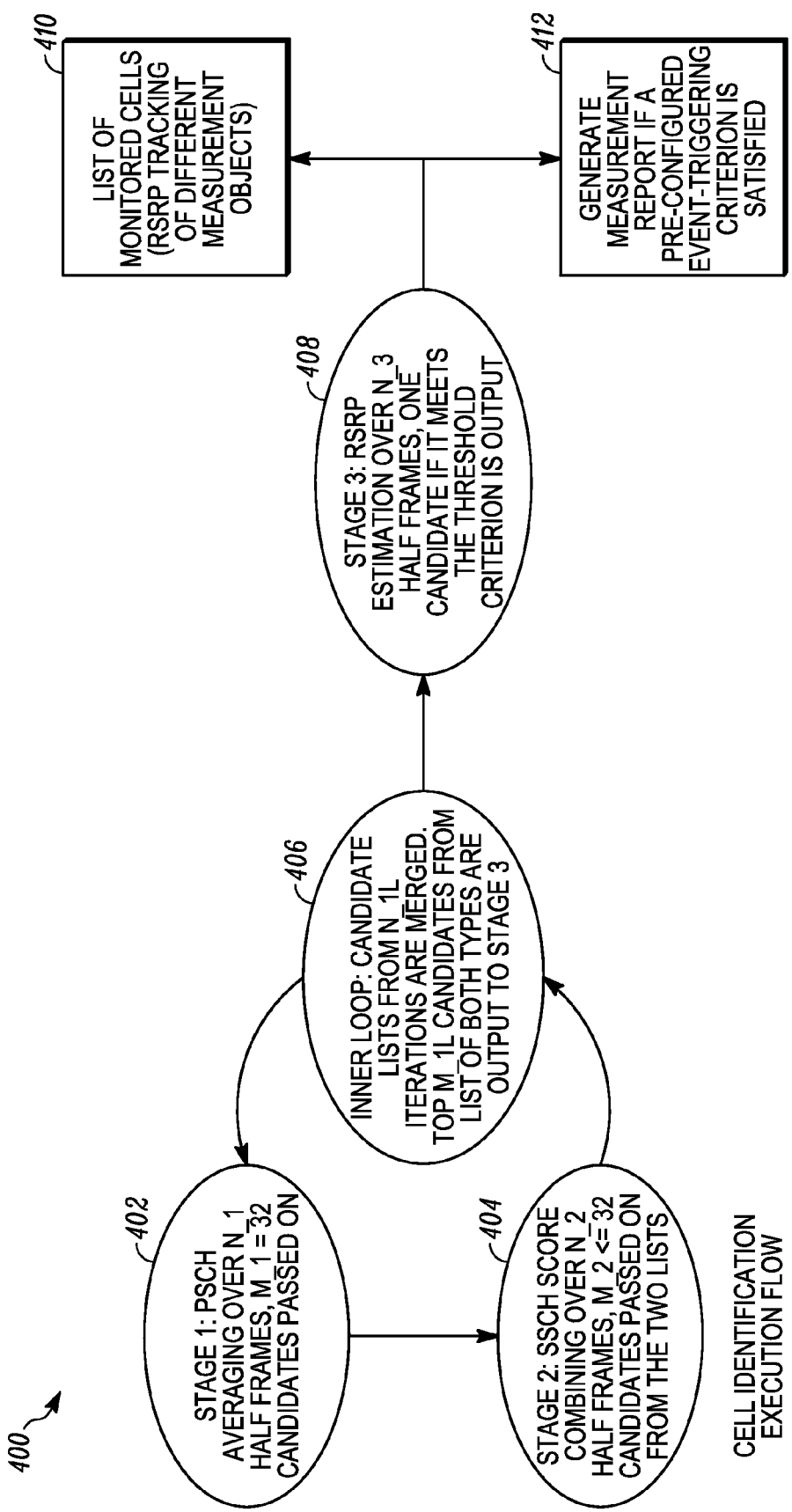
FIG. 4 is a block diagram illustrating the execution stages/steps involved in cell identification via joint SCH power estimation using an iterative filtering loop, according to one embodiment.

FIG. 4 is a block diagram illustrating the execution stages/steps involved in cell identification via joint SCH power estimation using an iterative filtering loop, according to one embodiment. Cell Identification (ID) execution flow 400 provides cell identification via three stages, stage 1, stage 2 and stage 3, as illustrated by first execution step 402, second execution step 404 and fourth execution step 408. In cell ID execution flow 400, execution of the cell ID procedure via joint SCH power estimation occurs via a pipelined implementation in which execution of "successive" stages overlap in time, as described in FIG. 5. Stage 1 is an iterative stage in which a number of half frames of a received signal (i.e., at UE/MS102) are processed individually by correlating a half frame against (three) candidate PSCH sequences to extract a number (e.g., $L_1$=256) of candidate (interferer) Orthogonal Frequency Division Multiplexing (OFDM) symbol timing and PSCH index combinations, which number of candidates correspond to the leading correlation metrics.

Stage 1

Stage 1 is further described by considering a half-frame of 5 ms duration. CSM 220 filters the received signal (e.g., to generate a 1.08 MHz bandwidth (BW) received signal). In one exemplary embodiment, the received signal in a half-frame of 5 ms duration is correlated against codewords corresponding to all 3 PSCH hypotheses (i.e., candidate sequences) resulting in 3×T correlation metrics, where T is the number of timing hypotheses. For a 5 ms half-frame and a sample rate of 1.92 MHz, T=9600, which results in a total of 28800 correlation metrics per half-frame. In order to keep the memory requirements and computational complexity low, only the top $L_1$=256 correlation metrics are retained for each half frame. The two vectors of $L_1$ correlation metrics for each of the $N_1$ half-frames are stored and accumulated. The $L_1$=256 correlation metrics for the half-frame are merged with the $L_1$=256 correlation metrics for the second half-frame leading to $X_1$ (256<=$X_1$<=512) candidate correlation metrics. However, only the top $L_1$=256 correlation metrics from this merged list of size $X_1$ candidates are retained for further processing. In a similar fashion, the list of $L_1$=256 correlation metrics at the end of processing the second half-frame are merged with the correlation metrics for the third half-frame and this operation is continued until all of the $N_1$ half-frames are processed.

In this embodiment, after processing each half-frame, the correlation metrics are indexed according to the PSCH and symbol timing hypotheses and are stored in a vector in memory. The stored correlation metrics are accumulated (i.e., summed non-coherently if the indices corresponding to the same PSCH/timing hypotheses match) for the different half-frames by merging the lists, which may increase the size of the list. The merging operation comprises extending the list if new PSCH/timing hypotheses arise out of processing a new half-frame. When processing of the last half-frame, a smaller number of candidates (e.g., 32 candidates) corresponding to the leading accumulated correlation metrics are retained from the list of $L_1$=256 candidates. Following the processing/averaging of all $N_1$ half-frames (and therefore the received signal corresponding to $N_1$ PSCH symbols), the leading $M_1$ (in this instance 32) candidate correlation metrics are passed to stage 2.

Stage 2

Stage 2 is an iterative stage in which CSM 220 generates a score for each of the hypothetical SSCH sequences associated with the $M_1$ candidates from stage 1. CSM 220 uses the last half frame of stage 1, which half-frame is stored in the half-frame buffer, for generating the respective scores. Each SSCH sequence has an associated CP length hypothesis (normal and extended) and a half-frame timing hypothesis (first half-frame or second half-frame). For each candidate from stage 1, CSM 220 implements the programmed method (in this instance Method 1) from among the three possible methods for generating SSCH scores. According to one embodiment, selection of a particular one of the programmed methods is based on whether the PSCH may be used as a phase reference for estimating the SSCH codeword power for that candidate, as explained below. Thus, in the described embodiments, CSM 220/UE 102 implements a single method. However, embodiments can be provided in which CSM 220 is programmed to dynamically select one method from among the different methods when CSM 220 determines that there is an interference problem from the serving cell.

A candidate from stage 1 having the same PSCH as the serving cell and having timing that is within one half CP length of the serving cell is considered. In other words, a first transmission received from the serving cell substantially overlaps in time with second transmission received from a candidate/neighbor/interferer cell. Furthermore, the candidate is characterized by the fact that the serving cell is several dBs higher in power than the power of the candidate. Using PSCH as the phase reference for computing SSCH correlations (which are the same as estimating the scaled SSCH received power) results in extremely noisy estimates of SSCH correlation. This is because the PSCH sequences are the same for both the serving cell and the candidate cell. Therefore, a channel estimate formed from a PSCH symbol, which is used for computing the SSCH correlations, corresponds to the sum channel of the serving and candidate cells rather than an estimate of the candidate cell channel. This leads to severe performance degradation of the SSCH processing stage and, when the serving cell is dominant (which is expected when the UE is not at a cell edge), as the serving cell SSCH sequence may yield false candidates in the SSCH stage due to the non-zero cross-correlation between the SSCH sequences. To mitigate this potential problem, whenever a candidate from stage 1 has the same PSCH sequence as the serving cell and is closely aligned in symbol timing with the serving cell, neighbor/interferer cell identification is performed based on a first cell identification procedure that jointly estimates the SSCH received power. The SSCH received power provides/forms the SSCH score described in the section presented below, titled "*Joint Estimation of SCH Received Power*".

However, whenever a candidate from stage 1 is not closely aligned in symbol timing with the serving cell, neighbor/interferer cell identification is performed based on an alternative cell identification procedure in which a channel estimate determined from the received PSCH symbol is used for computing SSCH correlations corresponding to unidentified neighbor cells. The SSCH received power via this alternative cell identification procedure provides/forms the SSCH score based on coherent processing performed as if there is no interference from the serving cell. To elaborate further, in coherent processing, the received PSCH signal is used to estimate the channel response associated with the received PSCH and SSCH signals. This estimated channel response is then used to construct a correlation metric associated with a hypothetical SSCH symbol that corresponds to an undetected/unidentified neighbor cell.

According to the respective case, CSM 220 employs one of the above mentioned cell identification procedures for ranking the SSCH/half-frame timing/CP length hypotheses for each candidate from stage 1. A separate list of $L_2$=256 candidates with the leading SSCH scores is formed for a respective method. The SSCH scores are similarly obtained for the next half frame and two lists with $L_2$=256 candidates are similarly generated. These lists are separately merged with the lists from the previous half frame and the top $L_2$=256 candidates are retained after merging. This merging of lists is repeated for a total of $N_2$ half frames (or equivalently, received signal corresponding to $N_2$ SSCH symbols). If a cell has (a) a closely aligned timing, (b) a same half-frame hypothesis, and (c) a same CP length hypothesis as that for the (same) cell in the previous half-frame, CSM 220 adds the SSCH scores during list merging. Finally, a threshold is applied to the aggregated SSCH scores and $M_2 \leq 32$ candidates that pass the threshold test from each list are passed from stage 2 to the inner loop for filtering.

Inner Loop

A first (single) iteration is defined as the processing of stage 1 followed by stage 2. At the end of the first iteration, as described earlier, two separate lists are output to the inner loop based on different methods used for constructing the SSCH correlation score. A total of $N_{IL}$ iterations are performed which generates $N_{IL}$ lists of either type. In the end, these lists are separately merged and $M_{IL}$ candidates from the merged lists of both types are output to stage 3, which is the RSRP estimation stage. A similar approach as utilized in stage 2 is used for merging lists involving an aggregation of SSCH scores.

Stage 3

For each of the $2M_{IL}$ candidates from the inner loop, RSRP measurement is performed using averaging of $N_3=4$ subframes with a successive separation of $T_3=50$ ms. In each half frame, either subframe 0 or subframe 5 is used for each candidate for generating an estimate and $N_3$ of such estimates are averaged to determine an RSRP measurement per candidate. At the end of this stage, only those candidates fulfilling a threshold criterion RSRP>$T_3$ are passed on as output of the cell identification module for one of: (a) providing an RSRP measurement report for an already configured event-trigger reporting criterion (i.e., execution step 412); and (b) allowing a newly detected candidate into the monitored cell list (i.e., execution step 410).

Figure 5:
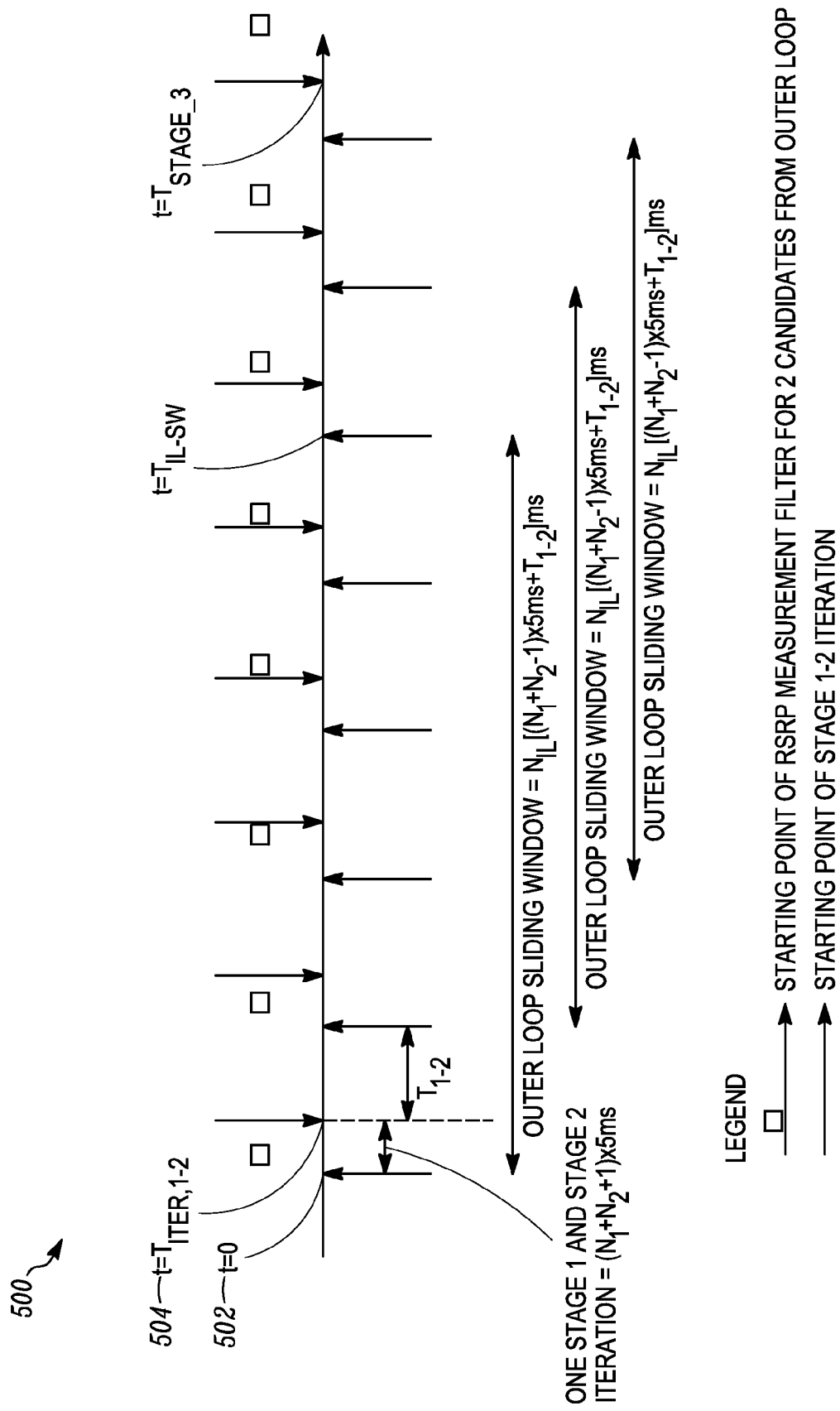
FIG. 5 is an illustration of a time-line of different events associated with the execution of various stages in the pipelined implementation of a cell identification procedure, according to one embodiment.

FIG. 5 is an illustration of a time-line of different events associated with the execution of various stages in the pipelined implementation of a cell identification procedure, according to one embodiment. Time-line 500 shows various time instants and the events associated with the different time instants. These time instants include first time instant 502 and second time instant 504. Time-line 500 also comprises legend 510.

According to time-line 500, at time t=0 (i.e., first time instant 502), a stage 1-stage 2 iteration begins. At time t=$T_{iter,1-2}$ (i.e., second time instant 504), one stage 1-stage 2 iteration is completed. At the end of each stage 1-stage 2 iteration, there is time gap of $T_{1-2} \geq 0$ ms seconds to enable time diversity in slow fading channels. Therefore, one stage 1-stage 2 iteration together with the time gap takes $[(N_1+N_2-1)\cdot 5+T_{1-2}]$ ms. The inner loop filters a number, $N_{IL}$, of such iterations. Stage 3 takes $N_3 \cdot T_3$ ms to execute. Typically, for the intra-frequency case when DRX (i.e., discontinuous reception mode) is not enabled, $N_3 \geq 4$ and $T_3 \geq 50$ ms, resulting in a total RSRP measurement period equal to 200 ms. The minimum total time, therefore, for generating a candidate that meets the thresholding (i.e., the applied threshold) from start of stage 1 in the first iteration is equal to $[(N_1+N_2-1)5+T_{1-2}]N_{IL}+N_3T_3$.

Joint Estimation of SCH Received Power

To facilitate a clear description of the joint estimation of SCH received power, a case in which there are only two cells, a target cell and an interfering cell, is considered. The received signal on the n-th resource element (RE) within the k-th cluster, denoted as $y_{k,n}$, may be written as:

$$y_{k,n} = h_k^0 s_{k,n}^0 + h_k^1 s_{k,n}^1 + z_{k,n},$$

where $h_k^0$ and $h_k^1$ are respectively the channel coefficients corresponding to the target cell and the interfering cell respectively. In addition, $s_{k,n}^0$, and $s_{k,n}^1$, are respectively the transmitted symbols of the SCH sequence from target and interfering cells, and $z_{k,n}$, is a noise process such that the terms are independent and identically distributed (i.i.d) with CN (0, $\sigma^2$) distribution (where CN represents a Circularly-Symmetric Normal probability distribution).

Figure 6:
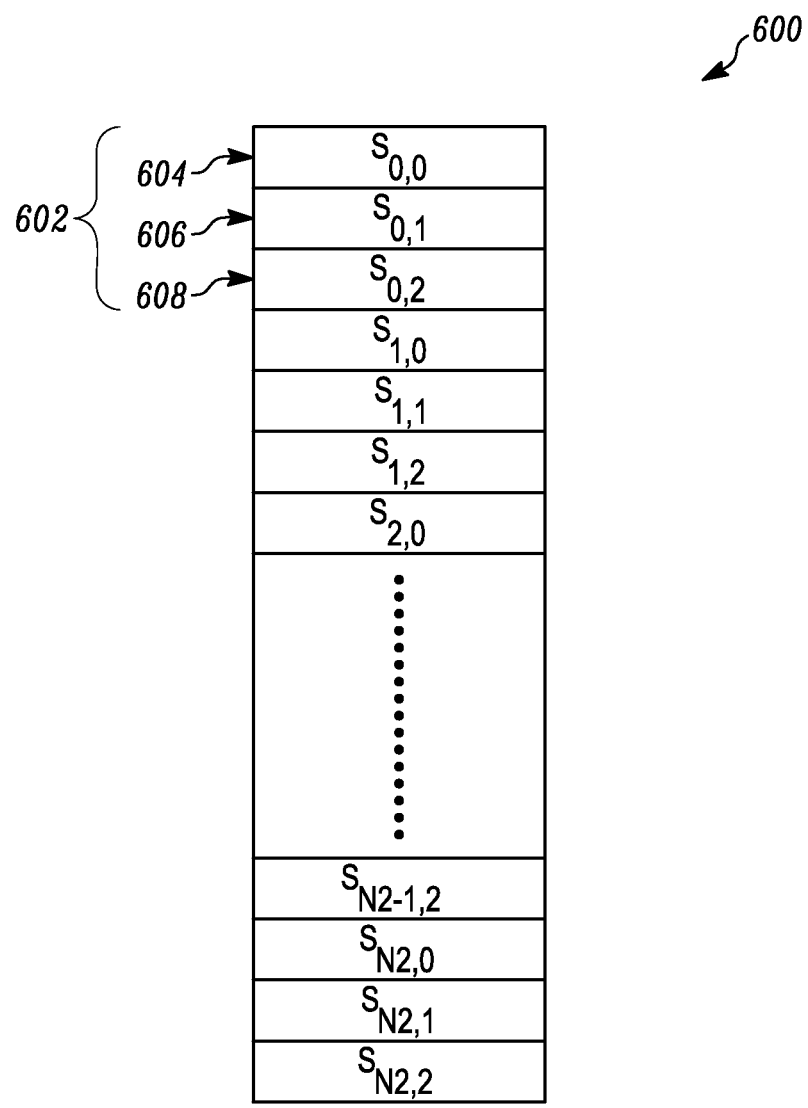
FIG. 6 is a block diagram representation of SCHs via corresponding SCH sequence/symbol identifiers and the decomposition of the SCHs into coherent clusters, according to one embodiment.

The SCH signal may be broken down into disjoint sets of symbols or coherence clusters, where a coherence cluster is defined as a group of resource elements (RE's) s within a time-frequency region for which the propagation channel is substantially the same. An assumption is made that the symbols belonging to a same cluster (e.g., cluster 602 of FIG. 6) have the same fading propagation channel. One such illustration with $N_1=3$ (i.e., there are three (3) symbols in a coherence cluster) is provided in FIG. 6. FIG. 6 is a block diagram representation of SCHs via corresponding SCH sequence/symbol identifiers and the decomposition of the SCHs into coherent clusters, according to one embodiment. SCH cluster set 600 comprises first symbol (identifier) 604, second symbol 606 and third symbol 608. These 3 symbols (i.e., $N_1=3$) collectively constitute first coherence cluster 602.

It is assumed that signal components from the two cells (i.e., the target cell and the interfering cell) are uncorrelated with each other and with the noise process. In one embodiment, CSM 220 uses the known, transmitted SSCH channel/sequence to filter the received signal to obtain a first receive component associated with the SCH signal transmitted. In addition, CSM 220 uses SSCH channel/sequences corresponding to possible interferer/neighbor cells to obtain a second receive component associated with the collective set of SCH channels/sequences from interfering cells. These first and second receive components/sums are illustrated as follows:

$$\bar{y}_k^0 = \frac{1}{N_1} \sum_{n=0}^{N_1-1} y_{k,n}(s_{k,n}^0)^* \text{ and } \bar{y}_k^1 = \frac{1}{N_1} \sum_{n=0}^{N_1-1} y_{k,n}(s_{k,n}^1)^*,$$

where x* denotes the complex-conjugate of x. However, in order to further remove (from the first receive component) sub-components that may be closely aligned in timing with serving cell (i.e., are coarsely synchronous with the serving cell), CSM 220 performs a cross correlation between the target and interfering SCHs to obtain a "filter" result which is applied to the second receive component to yield these sub-components from the interferer cells. The subcomponents are removed (via a linear transformation) from the first receive component to provide an estimate of the SCH sequence transmitted from the serving cell, including noise. An estimate of the collective SCH sequences (including noise) that corresponds to the interferer cells is similarly obtained.

These two (estimate/resultant) terms obtained by using a linear transformation are presented as follows:

$$x_k^0 = \bar{y}_k^0 - \rho_k \bar{y}_k^1$$

and $$x_k^1 = \bar{y}_k^1 - \rho_k^* \bar{y}_k^0,$$

where $$\rho_k = \frac{1}{N_1} \sum_{n=0}^{N_1-1} s_{k,n}^1 (s_{k,n}^0)^*$$

(i.e., the cross correlation term).

The cross-correlations satisfy the condition $|\rho_k| \leq 1$. The resultant terms may be written as $$x_k^0 = (1 - |\rho_k|^2)h_k^0 + (w_k^0 - \rho_k w_k^1),$$

and $$x_k^1 = (1 - |\rho_k|^2)h_k^1 + (w_k^1 - \rho_k^* w_k^0),$$

where $$w_k^0 = \frac{1}{N_1} \sum_{n=0}^{N_1-1} z_{k,n}(s_{k,n}^0)^*$$

and $$w_k^1 = \frac{1}{N_1} \sum_{n=0}^{N_1-1} z_{k,n}(s_{k,n}^1)^*.$$

A residual signal is formed by subtracting off the estimates for target and interfering signal components from the received signal as shown below:

$$r_{k,n} = y_{k,n} - \frac{x_k^0 s_{k,n}^0}{1 - |\rho_k|^2} - \frac{x_k^1 s_{k,n}^1}{1 - |\rho_k|^2}.$$

In order to be able to subtract off the signal component as shown above, it is necessary that $|\rho_k|<1$ be satisfied. Therefore, all clusters for which $|\rho_k|=1$ are excluded from computation of SCH power estimates. For ease of illustration, one can denote by $N_2$ the number of clusters for which $|\rho_k|<1$ and that are usable for joint SCH power estimation.

The above term can be simplified as $$r_{k,n} = z_{k,n} \underbrace{\left[1 - \frac{1}{N_1(1-|\rho_k|^2)}(2 - \rho_k s_{n,k}^0(s_{n,k}^1)^* - \rho_k^* s_{n,k}^1(s_{n,k}^0)^*)\right]}_{=\alpha_{k,n}} + \sum_{k' \neq k} \beta_{k'} z_{k',n},$$

for some constants $\beta_k$.

Next, an estimate of the residual noise process variance is formed as $$\hat{\sigma}^2 = \frac{\sum_{k=0}^{N_2-1} \sum_{n=0}^{N_1-1} |r_{k,n}|^2}{\sum_{k=0}^{N_2-1} \sum_{n=0}^{N_1-1} |\alpha_{k,n}|^2},$$

where $\alpha_{k,n}$ is defined in the previous equation. It can be verified that $E[\hat{\sigma}^2] \sigma^2$.

The estimate of the noise process is then used to estimate the signal power corresponding to both cells as follows. First, the following two terms may be constructed as follows:

$$Y_0 = \frac{1}{N_2} \sum_{k=0}^{N_2-1} \left|\frac{x_k^0}{1-|\rho_k|^2}\right|^2$$

and $$Y_1 = \frac{1}{N_2} \sum_{k=0}^{N_2-1} \left|\frac{x_k^1}{1-|\rho_k|^2}\right|^2.$$

It can be verified that $$E[Y_0] = E\left[\frac{1}{N_1 N_2} \sum_{k=0}^{N_2-1} \sum_{n=0}^{N_1-1} |h_{k,n}^0|^2\right] + \frac{\sigma^2}{N_1 N_2} \sum_{k=0}^{N_2-1} \frac{1}{1-|\rho_k|^2}$$

and $$E[Y_1] = E\left[\frac{1}{N_1 N_2} \sum_{k=0}^{N_2-1} \sum_{n=0}^{N_1-1} |h_{k,n}^1|^2\right] + \frac{\sigma^2}{N_1 N_2} \sum_{k=0}^{N_2-1} \frac{1}{1-|\rho_k|^2}.$$

The first terms of the above two equations are respectively the mean signal power for the target cell and the interfering cell. SCH power estimates for the target and interfering cells, denoted as $\hat{\xi}_0$ and $\hat{\xi}_1$ respectively, can be written as:

$$\hat{\xi}_0 = Y_0 \frac{\hat{\sigma}^2}{N_1 N_2} \sum_{k=0}^{N_2-1} \frac{1}{1-|\rho_k|^2}$$

and $$\hat{\xi}_1 = Y_1 \frac{\hat{\sigma}^2}{N_1 N_2} \sum_{k=0}^{N_2-1} \frac{1}{1-|\rho_k|^2} \text{ respectively.}$$

Although, the generation of SCH power estimates may have been described and illustrated with occasional reference to a single interferer cell, one skilled in the art will find it straightforward to generalize these equations/computations to cases in which there are two or more interfering signals. Furthermore, the method described above may also be used to jointly estimate the RSRP for two (or more) cells that are synchronous and for which the cell-specific reference symbols (CRS) of the two (or more) cells map into the same set of RE's within the subframe. In this method, the resource elements grouped into a coherent cluster may be transmitted on different OFDM symbols as long as the propagation channel is substantially the same between the different OFDM symbols.

Figure 7:
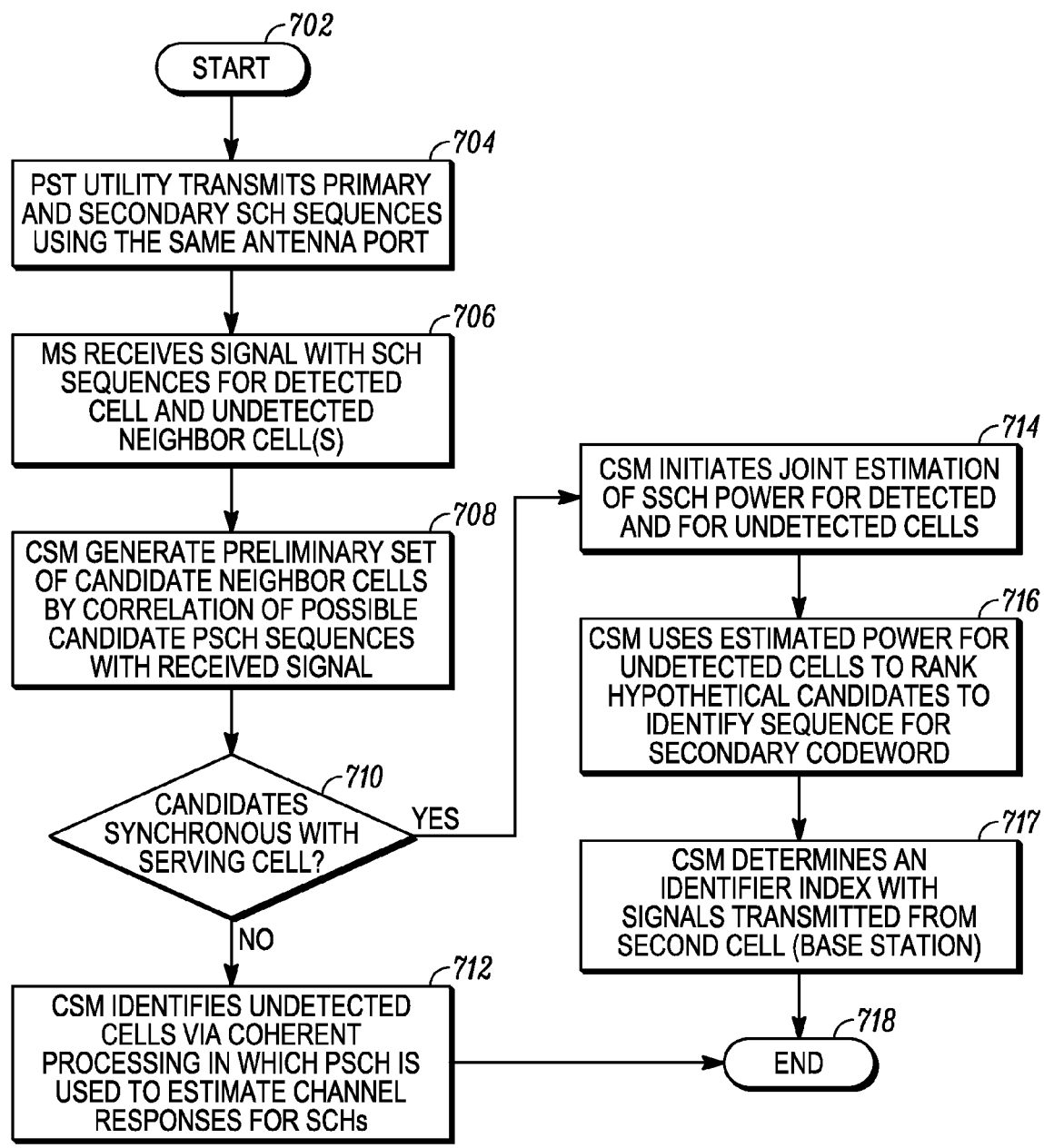
FIG. 7 is a flow chart which illustrates the process of identifying neighbor cells by using a joint estimation of SSCH power for detected and for undetected cells, according to one embodiment.

FIG. 7 is a flow chart which illustrates the process of identifying neighbor cells by using a joint estimation of SSCH power for detected and for undetected cells, according to one embodiment. Although the method illustrated in FIG. 7 may be described with reference to components shown in FIGS. 1-6, it should be understood that this is merely for convenience and alternative components and/or configurations thereof can be employed when implementing the method. Key portions of the method may be completed by CSM 220 executing within MS/UE 102 (FIGS. 1-3) and controlling specific operations of/on MS/UE 102, and the method is thus described from the perspective of either/both CSM 220 and MS/UE 102.

The process begins at initiator block 702 and proceeds to block 704, at which, PST utility 120 (from the serving cell) transmits primary and secondary SCH sequences from the same logical transmit antenna port. At block 706, MS/UE 102 receives a signal with SCH sequences corresponding to detected cell(s) and undetected neighbor cell(s) (e.g., second base station/eNB 150). At block 708, CSM 220 generates preliminary set of candidate interferers by performing correlations between (a) possible, candidate PSCH sequences and (b) the received signal. At decision block 710, CSM 220 determines whether the candidate neighbor cell sequences are synchronous with the serving cell. If at decision block 710 CSM 220 determines that the candidate neighbor cells are not synchronous with the serving cell, CSM 220 identifies undetected cells via coherent processing in which the received PSCH signal is used to estimate the channel response associated with the received PSCH and SSCH signals, as shown at block 712. This estimated channel response is then used to construct a correlation metric associated with a hypothetical SSCH symbol that corresponds to an undetected/unidentified neighbor cell. If CSM 220 determines that the candidate interferers are synchronous with the serving cell, CSM 220 initiates joint estimation of SSCH power for detected and for undetected cells, as shown at block 714. At block 716, CSM 220 uses the joint estimated SSCH power for undetected cells to rank hypothetical candidates to identify sequence and associated neighbor cell associated with secondary codeword. In one embodiment, CSM 220 determines an identifier index associated with at least one of a PSCH and a SSCH transmitted from the second base station/neighbor cell (block 717) based on one of: (a) the estimated received power; and (b) the channel response associated with the SSCH transmission from the first base station (i.e., the serving cell). The process ends at block 718.

Method 2: Cell Identification Post-Interference Subtraction

The procedures of the following method are used for estimating and subtracting off synchronization signals corresponding to the known (or already detected) cells. With this method an assumption is made that the receiver device (MS/UE 102) has a list of already detected cells (i.e., the "detected cell list"). Each entry in the detected list has the following attributes: (a) a physical cell identity (PCID); (b) a CP-type; (c) symbol timing; and (d) half-frame timing.

Figure 8:
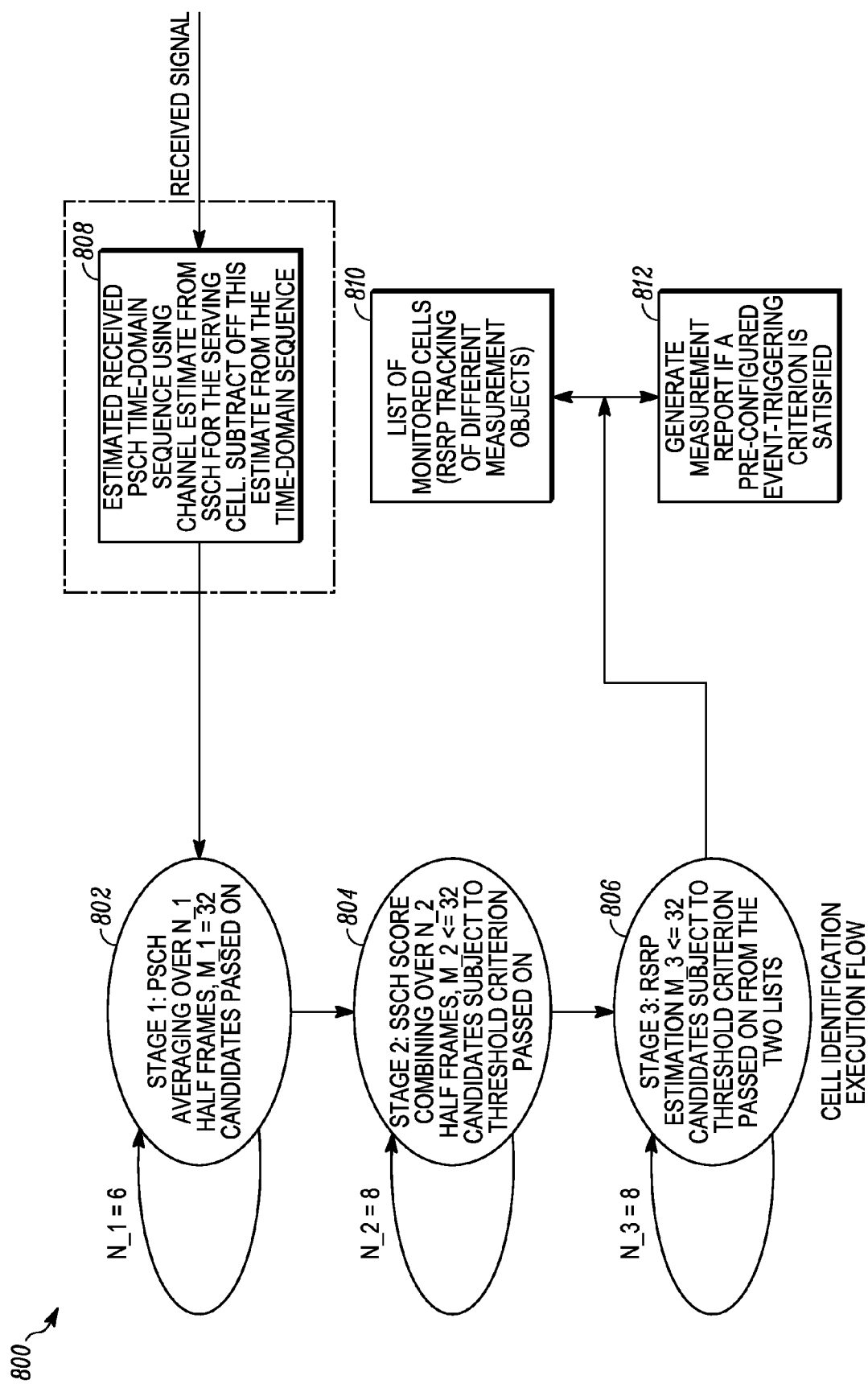
FIG. 8 is a block diagram illustrating the execution stages/steps involved in cell identification via post interference subtraction, according to one embodiment.

FIG. 8 is a block diagram illustrating the execution stages/steps involved in cell identification via post interference subtraction, according to one embodiment. Cell Identification (ID) execution flow 800 provides cell identification via three stages. Stage 1, stage 2, and stage 3 are respectively illustrated by first execution step 802, second execution step 804 and third execution step 806. The cell searcher/identification module/CSM 220 looks for a new cell that may become detectable at an arbitrary time. This cell may be synchronous (i.e., within a +/− tolerance amount of time) with any of the cells in the detected list. In order to mitigate the effect of interference from the detected cells on the ability of the CSM 220 to identify a newly detectable cell, CSM 220 estimates the synchronization channel corresponding to the detected cells and subtracts off the estimated synchronization channel from the received signal, as shown at execution step 808. The subtracted synchronization channel may be either primary or both primary and secondary SCHs.

The received signal may be written as $$y_s = h_0 \cdot s_0 + h_1 \cdot s_1 + z,$$

where $h_0$ and $s_0$ correspond to the subcarrier-wise channel vector and the secondary synchronization channel corresponding to the newly detectable cell, $h_1$ and $s_1$ correspond to the subcarrier-wise channel vector and secondary synchronization channel corresponding to a detected cell, and z is the residual noise vector.

In the present embodiment, the following steps are adopted for implementing interference subtraction:

1. The channel $h_1$ associated with the detected cell is estimated either by frequency-domain methods (e.g., local averaging, minimum mean square error (MMSE), etc.) or time/frequency-domain methods (e.g., DFT-based approach) from $y_s$ assuming that the signal from the newly detectable cell is absent. The estimate may be denoted by $\hat{h}_1$.

2. The template signal corresponding to the primary and the secondary synchronization signals for the detected cell are constructed as $\hat{h}_1 \cdot p_1$ and $\hat{h}_1 \cdot s_1$ respectively, where $p_1$ is the PSCH vector and $s_1$ is the SSCH vector.

3. The estimates are subtracted from the received signal in the frequency-domain. Alternatively and equivalently, the reconstructed signal may be subtracted in the time-domain.

Following the subtraction of the estimates from the received signal, stage 1, stage 2 and stage 3 processing are implemented. At end of stage 3, candidates are passed on as output of the cell identification module for one of: (a) providing an RSRP measurement report for an already configured event-trigger reporting criterion (i.e., execution step 812); and (b) allowing a newly detected candidate into the monitored cell list (i.e., execution step 810).

Figure 9:
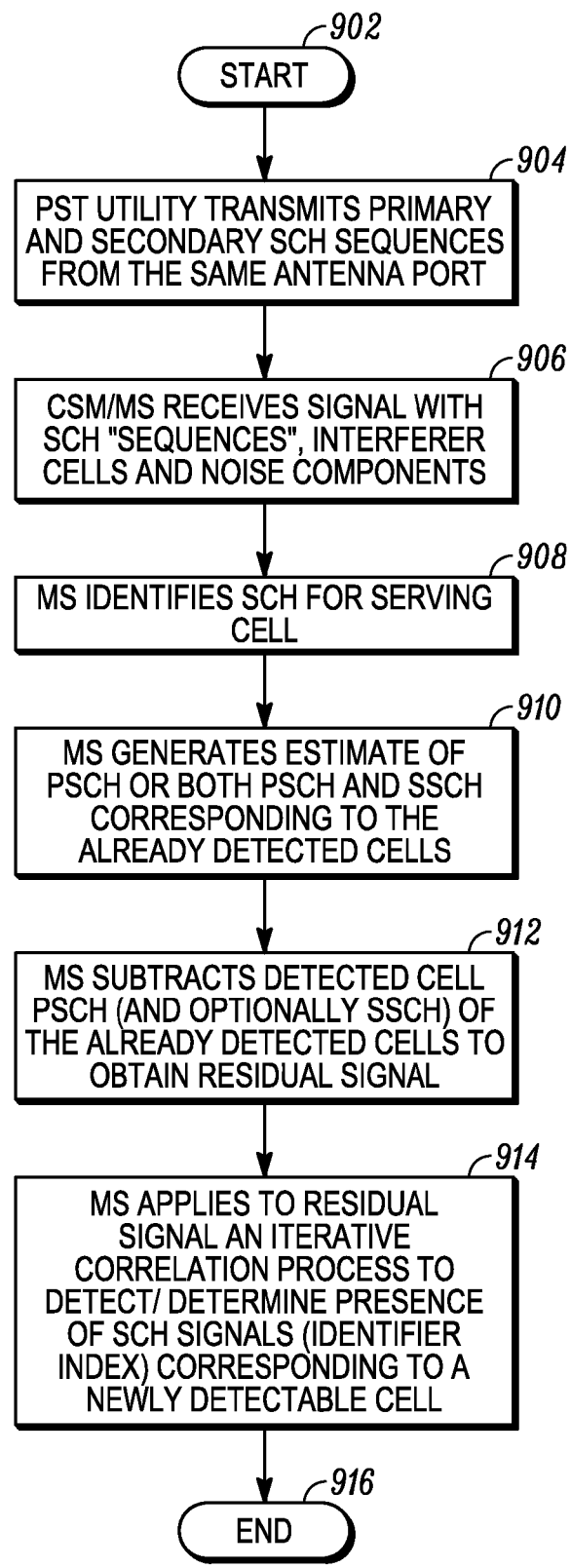
FIG. 9 is a flow chart which illustrates the process of identifying neighbor cells by using a joint estimate of SCHs corresponding to the already detected cells, according to one embodiment.

FIG. 9 is a flow chart which illustrates the process of identifying neighbor cells by using a joint estimate of SCHs corresponding to the already detected cells, according to one embodiment. Although the method illustrated in FIG. 9 may be described with reference to components shown in FIGS. 1-3 and 8, it should be understood that this is merely for convenience and alternative components and/or configurations thereof can be employed when implementing the method. Key portions of the method may be completed by CSM 220 executing within MS/UE 102 (FIGS. 1-3) and controlling specific operations of/on MS/UE 102, and the method is thus described from the perspective of either/both CSM 220 and MS/UE 102.

The process begins at initiator block 902 and proceeds to block 904, at which, PST utility 120 transmits primary and secondary SCH sequences from the same logical transmit antenna port. At block 906, MS 102 receives a signal with SCH sequences, corresponding to detected cell(s) and undetected neighbor cells. At block 908, CSM 220 estimates SCH for the detected cell(s) which may include the serving cell. CSM 220 generates an estimate of the received signals corresponding to PSCH or both PSCH and SSCH for the already detected cells, as shown at block 910. CSM 220 subtracts this estimate from the received signal to obtain the residual signal, as shown at block 912. At block 914, CSM 220 applies an iterative correlation procedure to the residual signal to detect the presence of SCH signals corresponding to a newly detectable cell. The process ends at block 916.

Method 3: Joint Channel Estimation Method

Method 3 provides a coherent form of detection and contains some overlap in functionality with Method 1. Specifically, Method 1 and Method 3 form two forms of detection, non-coherent and coherent, respectively. FIG. 6, which was described above with reference to Method 1, illustrates a decomposition of SSCH RE into disjoint sets of coherent and non-coherent clusters. Additionally, the cell ID execution flow illustrated in FIG. 4 and described with respect to Method 1 also applies to Method 3.

The received signal in the frequency-domain on one such cluster can be written as $$y = h_0 s_0 + \underbrace{[s_1 \ s_2 \ \ldots \ s_L]}_{s} \underbrace{\begin{bmatrix} h_1 \\ h_2 \\ \vdots \\ h_L \end{bmatrix}}_{h} + z,$$

where $s_1, s_2, \ldots s_L$ are size $N_1 \times 1$ vectors corresponding to SSCH REs in the coherence cluster (a coherence cluster is defined as a group of REs within a time-frequency region for which the propagation channel is substantially the same) under consideration for L detected cells, $s_0$ is a size $N_1 \times 1$ vector of S-SCH REs corresponding to an undetected cell, $h_j$ is the frequency-domain channel coefficient for the j-th cell, and z is the residual noise vector. A least-squares joint estimate of the L+1 channel coefficients may be formed from the observation as $$\begin{bmatrix} \hat{h}_0 \\ \hat{h} \end{bmatrix} = (X^H X)^{-1} X^H y,$$

where $X=[s_0\ S]$.

In the above equation, S is a known matrix corresponding to the detected cells, while $s_0$ corresponds to a cell with a hypothetical PCID, e.g. 0-503. A reduced complexity implementation that uses the Woodbury Identity (as illustrated below) is subsequently described. The channel coefficient estimate for the k-th cluster is denoted as $\hat{h}_0^{(k)}$ to make the dependence of this estimate on the cluster location explicit. The PSCH is then similarly partitioned into coherent clusters. CSM 220 generates an estimate, $\hat{h}'_0^{(k)}$, of the channel coefficient for the k-th cluster of the PSCH. A correlation metric that is defined as $$\frac{1}{N_2} \sum_{k=0}^{N_2-1} \hat{h}_0^{(k)} (\hat{h}_0'^{(k)})^*$$

is formed and is used for ranking the different hypotheses on PCID in stage 2.

A method for estimating $\hat{h}_0^{(k)}$ for the k-th cluster utilizing the Woodbury identity is below. The inverse of matrix $X^H X$ in the equation above (suppressing the cluster index k) can be written as, $$(X^H X)^{-1} = \frac{1}{N_1(1 + u^H Y^{-1} u)} \begin{bmatrix} 1 & u^H Y^{-1} \\ Y^{-1} u & Y^{-1}(I - uu^H)Y^{-1} \end{bmatrix},$$

where $$Y = S^H S,$$

$$u = \frac{1}{N_1} S^H s_0,$$

and based on the fact that $s_0^H s_0 = N_1$. The "H" superscript represents the conjugate transpose operation. Therefore, $$\hat{h}_0 = \frac{(s_0^H + u^H Y^{-1} S^H) y}{N_1(1 + u^H Y^{-1} u)} = \frac{s_0^H (N_1 + SY^{-1} S^H) y}{s_0^H (N_1 + SY^{-1} S^H) s_0}.$$

For a set of detected cells, the quantity $(N_1 + SY^{-1}S^H)$ may be computed on a per-cluster basis once and may be reused for estimating the channel coefficient for different hypotheses on the PCID, where the different hypotheses lead to different values/representations for $s_0$.

Figure 10:
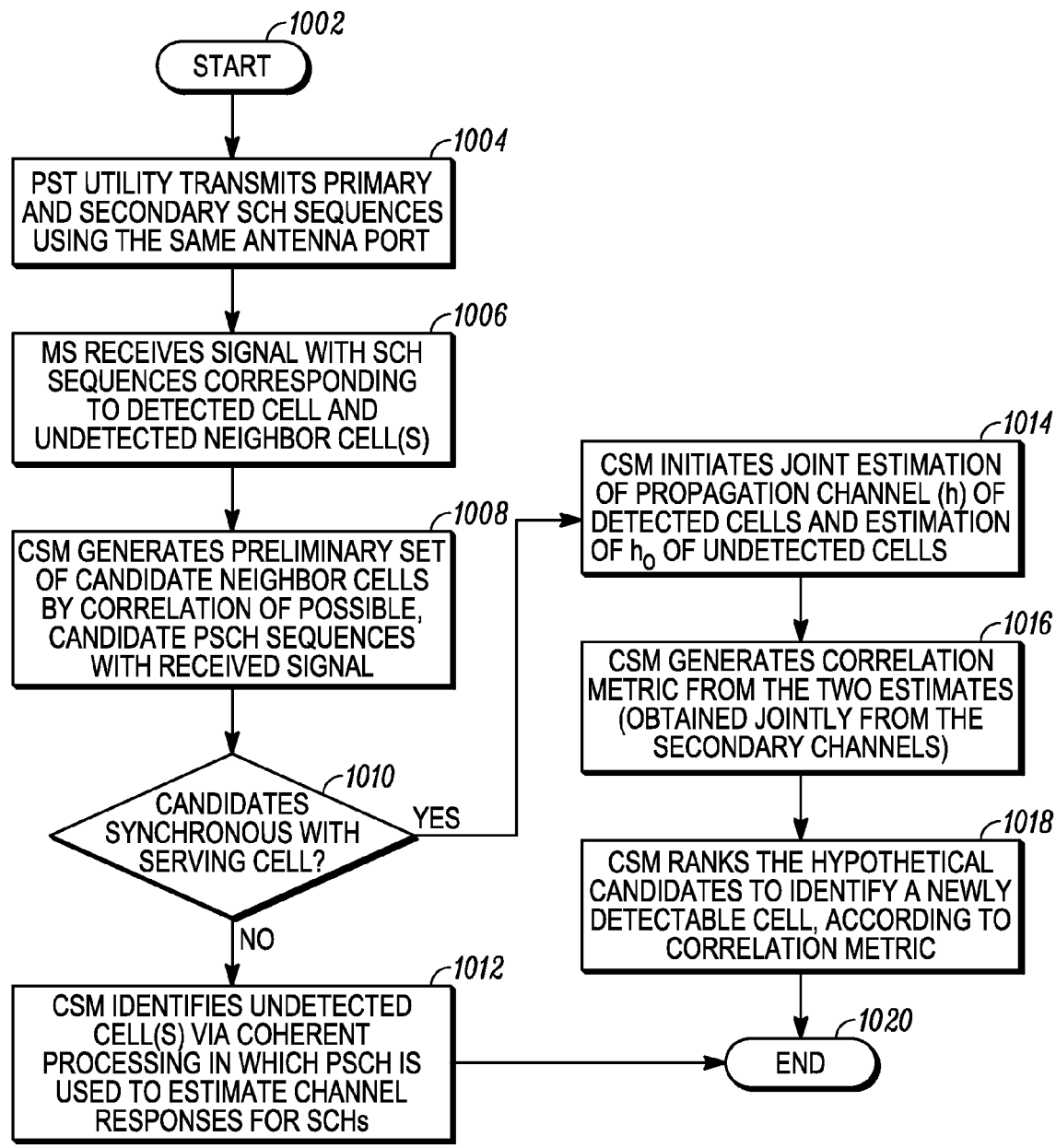
FIG. 10 is a flow chart which illustrates the process of identifying neighbor cells by using a joint estimation of propagation channels "h" of detected cells and estimation of "$h_o$" of undetected cells, according to one embodiment.

FIG. 10 is a flow chart which illustrates the process of identifying neighbor cells by using a joint estimation of propagation channels "h" of detected cells and estimation of "$h_o$" of undetected cells, according to one embodiment.

Although the method illustrated in FIG. 10 may be described with reference to components shown in FIGS. 1-3, it should be understood that this is merely for convenience and alternative components and/or configurations thereof can be employed when implementing the method. Key portions of the method may be completed by CSM 220 executing within MS/UE 102 (FIGS. 1-3) and controlling specific operations of/on MS/UE 102, and the method is thus described from the perspective of either/both CSM 220 and MS/UE 102.

The process begins at initiator block 1002 and proceeds to block 1004, at which, PST utility 120/eNB 106 transmits to a wireless device primary and secondary SCH sequences from the same logical transmit antenna port. At block 1006, CSM 220 receives a signal with SCH sequences for detected cell(s) and undetected neighbor cell(s) that overlap in time and frequency with serving cell transmission. At block 1008, CSM 220 generates preliminary set of candidate neighbor cells by performing correlations between possible, candidate PSCH sequences and the received signal. At decision block 1010, CSM 220 determines whether the candidate neighbor cells are synchronous with the detected cell(s) which may include the serving cell. If at decision block 1010 CSM 220 determines that the candidate neighbor cells are not synchronous with the serving cell, CSM 220 identifies the neighbor cells via coherent processing in which the received PSCH signal is used to estimate the channel response associated with the received PSCH and SSCH signals, as shown at block 1012. This estimated channel response is then used to construct a correlation metric associated with a hypothetical SSCH symbol that corresponds to an undetected/unidentified neighbor cell. If CSM 220 determines that the candidate interferers are synchronous with the serving cell, CSM 220 initiates interferer cell identification via (a) joint estimation of the propagation channel (h) of detected cells and (b) estimation of $h_o$ of undetected cells, as shown at block 1014. At block 1016, CSM 220 generates a correlation metric from the two estimates (obtained jointly from the secondary channels and from the primary channel). At block 1018, CSM 220 uses the correlation metric to rank hypothetical candidates to identify a newly detectable cell(s). The process ends at block 1020.

In the flow charts above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

The above described embodiments provide various methods performed by/in a wireless receiver. A first method comprises: receiving a signal that includes a first transmission from a first base station and a second transmission from a second base station. The first transmission from the first base station comprises a first PSCH and a first SSCH and the second transmission from the second base station comprises a second PSCH and a second SSCH. The first transmission received from the first base station substantially overlaps in time with the second transmission received from the second base station. The method further provides joint estimation of at least one of: (a) a received power associated with SSCH transmission from the first base station and the second base station; and (b) a channel response associated with SSCH transmission from the first base station and the second base station. Additionally, the method determines an identifier index associated with at least one of a PSCH and a SSCH transmitted from the second base station based on one of: (a) the estimated received power; and (b) the channel response associated with the SSCH transmission from the first base station. The method further comprises: generating a metric or score for the second base station based on jointly estimating the received power corresponding to the first base station and the received power corresponding to the second base station. The joint estimation is obtained using SSCH transmissions from the first base station and the second base station, and the first base station is a known cell and the second base station is an unidentified cell that corresponds to one of a plurality of candidate neighbor cells. The method further ranks the plurality of candidate neighbor cells to identify a newly detectable cell, according to the generated metrics or scores.

The first method further includes: determining the PCID of the second base station based on determination of the indices associated with PSCH and SSCH corresponding to the second base station; and including identification of the second base station in a monitored cell list based on determining that the estimated metric associated with the second base station is above a threshold. The method also provides: initiating of a joint estimation of one of: (a) received power; and (b) channel response, where the joint estimation is triggered by receipt of an indication from a third base station to initiate joint estimation, and where the third base station is the serving base station.

A second method comprises: receiving a signal that includes a first transmission from a first base station and a second transmission from a second base station. The first transmission from the first base station comprises a first PSCH and a first SSCH and the second transmission from the second base station comprises a second PSCH and a second SSCH. The first PSCH sequence transmitted from the first base station and the second PSCH sequence transmitted from the second base station are identical; The method further comprises re-constructing, by processing of the received signal, a signal component in the received signal corresponding to at least one of: (a) a PSCH transmitted from the first base station; and (b) a SSCH transmitted from the first base station. The second method includes utilizing the SSCH sequence associated with the SSCH transmitted from the first base station to reconstruct a signal component of the received signal; subtracting the re-constructed signal component from the received signal to obtain a residual received signal; determining an identifier index associated with at least one of PSCH and SSCH transmitted from the second base station based on processing the residual received signal.

The method further comprises: receiving a signal from the second base station including the transmission of a cell-specific reference signal (CRS) from the second base station; and estimating the reference signal received power (RSRP) associated with the second base station based on the received signal. In addition, the method further includes: sending a measurement report to a third base station, wherein the third base station is a serving base station and the measurement report includes the estimated RSRP associated with the second base station; comparing the estimated RSRP associated with the second base station to a pre-determined threshold level; and reselecting to a third base station as a consequence of determining that a criterion associated with the pre-determined threshold level is met. The method further includes determining the PCID of the second base station based on determination of the identifiers associated with PSCH and SSCH corresponding to the second base station; including identification of the second base station in a monitored cell list based on determining that the estimated metric associated with the second base station is above a preset threshold; and initiating subtraction from the received signal of the signal component that is re-constructed and is associated with the first base station, in response to receiving an indication from a third base station to initiate subtraction, where the third base station is the serving base station.

A third method further comprises: generating a correlation metric for the second base station based on jointly estimating the propagation channel "h" corresponding to the first base station and the propagation channel "$h_o$" corresponding to the second base station. The joint estimation is obtained using SSCH transmissions from the first base station and the second base station, and the first base station is a known cell and the second base station is an undetected/unidentified cell that corresponds to one of a plurality of candidate neighbor cells. The method also ranks the plurality of candidate neighbor cells to identify a newly detectable cell, according to the generated correlation metrics. The method also comprises: receiving a signal from the second base station including the transmission of a cell-specific reference signal (CRS) from the second base station; and estimating the reference signal received power (RSRP) associated with the second base station based on the received signal. In addition, the method comprises: sending a measurement report to a third base station. The third base station is a serving base station and the measurement report includes the estimated RSRP associated with the second base station. The method comprises: comparing the estimated RSRP associated with the second base station to a threshold; and reselecting to a third base station as a consequence of determining that the threshold criterion is met.

In an alternate embodiment, the first method also comprises: receiving a signal that includes a first transmission from a first base station and a second transmission from a second base station. The first and second transmissions respectively comprise a reference signal transmitted on a OFDM symbol. The first and second transmissions substantially overlap in time and the respective reference signal is transmitted on a plurality of subcarriers on the respective OFDM symbols; grouping subcarriers in the received signal $\{y_{k,n}\}_{k=1,\ldots,K \text{ and } n=1,\ldots,N}$ into K clusters each with at least N subcarriers, wherein the subcarriers of a respective base station within a same cluster encounter a substantially similar propagation channel response; projecting a first vector corresponding to received subcarriers in a cluster to a second vector of signal template to obtain (a) a first metric $$\bar{y}_k^0 = \frac{1}{N_1} \sum_{n=0}^{N_1-1} y_{k,n}(s_{k,n}^0)^*$$

for the first base station and (b) a second metric $$\bar{y}_k^1 = \frac{1}{N_1} \sum_{n=0}^{N_1-1} y_{k,n}(s_{k,n}^1)^*$$

for the second base station, where $\{s_{k,n}^0\}_{n=1}^N$ is sequence of symbols in the signal template corresponding to the first base station in the k-th cluster and $\{s_{k,n}^1\}_{n=1}^N$ is sequence of symbols in the signal template corresponding to the second base station in the k-th cluster; and estimating an average signal power associated with at least one of the first base station and the second base station based on the metrics $\bar{y}_k^0$ and $\bar{y}_k^1$ for at least one cluster; where the reference signal is one or more of a PSCH and a SSCH; and where the reference signal is a cell-specific reference signal (CRS) and where the estimating the average signal power associated corresponds to estimating an RSRP associated with at least one of the first base station and the second base station.

Choosing Parameters

In one embodiment, CSM 220 utilizes a set of requirements on cell identification performance that specify that a certain x percentile (e.g., x percentile=90 percentile) successful detection time $T_{basic,identify}$ be achieved from the instant a new cell appears at a pre-specified signal level in relation to a particular configuration involving a serving cell and an interferer cell. For example, in E-UTRA Release 8 specification, the intra-frequency cell identification in the non-discontinuous reception (non-DRX) case is specified such that $T_{basic,identify}$=800 ms when SCH Ior/Ioc≥−6 dB for the target cell (where $I_{or}$ represents intra-cell interference and $I_{oc}$, represents inter-cell interference). In order to meet the 800 ms requirement for cell identification and RSRP measurement delay requirement of 200 ms, CSM 220 can dimension various parameters such that $[(N_1+N_2-1)5+T_{1-2}]N_{IL}+N_3T_3 \leq 600$ ms. CSM 220 specifies a "sufficient" condition based on the following two quantities: (a) detection failure probability, $(1-p_D)$ (i.e., the probability that an incorrect cell is measured and passed out of the cell identification module, where $p_D$=probability of correct detection); and (b) false alarm probability, $p_F$ (i.e., the probability that a detection attempt reports a cell even when there is no signal present). In one embodiment, CSM 220 specifies via the sufficient condition that the sum of the above two quantities is less than 10% for a 90 percentile correction detection to be within 800 ms. Thus, in other words, in order to pass the test, the following condition is sufficient:

$$(1-p_D)+p_F \leq 0.1.$$

Regarding the intra-frequency non-DRX case, CSM 220 may specify that the dedicated cell search module is run with a duty factor of at least 50%.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional MS/UE 102 with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless receiver device that operates within a wireless communication network having one or more base stations, a method comprising:
    receiving a signal that includes a first transmission from a first base station and at least one second transmission from at least one second base station;
    wherein the first transmission comprises a first primary synchronization channel (PSCH) and a first secondary synchronization channel (SSCH) and the second transmission comprises a second PSCH and a second SSCH;
    wherein the first transmission overlaps in time with the second transmission;
    jointly estimating at least one of: (a) a first received power associated with the first SSCH transmission from the first base station and a second received power associated with the SSCH transmission from the second base station; and (b) a first channel response associated with the first SSCH transmission from the first base station and a second channel response associated with the second SSCH transmission from the second base station; and
    determining an identifier associated with at least one of the second PSCH and the second SSCH transmitted from the second base station based on one of: (a) the estimated received second power; and (b) the second channel response.

2. The method of claim 1, further comprising:
    generating a metric for the second base station based on a joint estimation of the received power corresponding to the SSCH transmission from the first base station and the received power corresponding to the SSCH transmission from the second base station;
    wherein the first base station corresponds to a known cell and the second base station corresponds to an unidentified cell of a plurality of candidate neighbor cells;
    ranking the plurality of candidate neighbor cells to identify a newly detectable cell, according to the generated metric of each of the at least one second base station; and in response to determining that the estimated metric associated with the second base station is above a threshold, including identification of the second base station in a monitored cell list.

3. The method of claim 1, further comprising:
generating a correlation metric for the second base station based on a joint estimation of a propagation channel "h" corresponding to the SSCH transmission from the first base station and a propagation channel "$h_o$" corresponding to the SSCH transmission from the second base station;
wherein the first base station corresponds to a known cell and the second base station corresponds to an undetected/unidentified cell of a plurality of candidate neighbor cells; and
ranking the plurality of candidate neighbor cells to identify a newly detectable cell, according to the generated correlation metric of each of the at least one second base station.

4. The method of claim 3, further comprising:
in response to determining that the estimated correlation metric associated with the second base station is above a threshold, including identification of the second base station.

5. The method of claim 1, further comprising:
receiving from the second base station a second signal including a transmission of a cell-specific reference signal (CRS) of the second base station; and
estimating the reference signal received power (RSRP) associated with the second base station based on the received second signal.

6. The method of claim 5, further comprising:
sending a measurement report to a third base station, wherein the third base station is a serving base station and the measurement report includes the estimated RSRP associated with the second base station.

7. The method of claim 5, further comprising:
determining if the estimated RSRP associated with the second base station meets a threshold criterion; and
in response to determining that the threshold criterion is met by the estimated RSRP, reselecting to a next base station.

8. The method of claim 1, further comprising:
determining a physical cell identity (PCID) of the second base station by determining one or more indices associated with the second PSCH and the second SSCH.

9. The method of claim 1, further comprising:
initiating joint estimation of one of: (a) received power; and (b) channel response;
wherein the joint estimation is triggered by receipt of a trigger from a third base station to initiate joint estimation, wherein the third base station is the serving base station.

10. A wireless communication device comprising:
a processor;
a wireless transceiver connected to the processor; and
a memory coupled to the processor and having stored therein a cell searcher module, which when executed by the processor enables the device to perform the following functions:
receiving a signal that includes a first transmission from a first base station and at least one second transmission from at least one second base station;
wherein the first transmission comprises a first primary synchronization channel (PSCH) and a first secondary synchronization channel (SSCH) and the second transmission comprises a second PSCH and a second SSCH;
wherein the first transmission overlaps in time with the second transmission;
jointly estimating at least one of: (a) a first received power associated with the first SSCH transmission from the first base station and a second received power associated with the SSCH transmission from the second base station; and (b) a first channel response associated with the first SSCH transmission from the first base station and a second channel response associated with the second SSCH transmission from the second base station; and
determining an identifier associated with at least one of the second PSCH and the second SSCH transmitted from the second base station based on one of: (a) the estimated second received power; and (b) the second channel response.

11. The wireless communication device of claim 10, wherein the cell searcher module executes on the processor to cause the communication device to perform the functions of:
generating a metric for the second base station based on a joint estimation of the received power corresponding to the SSCH transmission from the first base station and the received power corresponding to the SSCH transmission from the second base station;
wherein the first base station corresponds to a known cell and the second base station corresponds to an unidentified cell of a plurality of candidate neighbor cells;
ranking the plurality of candidate neighbor cells to identify a newly detectable cell, according to the generated metric of each of the at least one second base station; and
in response to determining that the estimated metric associated with the second base station is above a threshold, including identification of the second base station in a monitored cell list.

12. The wireless communication device of claim 10, wherein the cell searcher module executes on the processor to cause the communication device to perform the functions of:
generating a correlation metric for the second base station based on a joint estimation of a propagation channel "h" corresponding to the SSCH transmission from the first base station and a propagation channel "$h_o$" corresponding to the SSCH transmission from the second base station;
wherein the first base station corresponds to a known cell and the second base station corresponds to an undetected/unidentified cell of a plurality of candidate neighbor cells;
ranking the plurality of candidate neighbor cells to identify a newly detectable cell, according to the generated correlation metric of each of the at least one second base station; and
in response to determining that the estimated correlation metric associated with the second base station is above a threshold, including identification of the second base station.

13. The wireless communication device of claim 10, wherein the cell searcher module executes on the processor to cause the communication device to perform the functions of:
receiving from the second base station a second signal including a transmission of a cell-specific reference signal (CRS) of the second base station;
estimating the reference signal received power (RSRP) associated with the second base station based on the received second signal;

sending a measurement report to a third base station, wherein the third base station is a serving base station and the measurement report includes the estimated RSRP associated with the second base station;

determining if the estimated RSRP associated with the second base station meets a threshold criterion; and in response to determining that the threshold criterion is met by the estimated RSRP, reselecting to a next base station.

14. In a wireless receiver device that operates within a wireless communication network having one or more base stations, a method comprising:

receiving a signal that includes a first transmission from a first base station and a second transmission from a second base station, wherein the first transmission from the first base station comprises a first primary synchronization channel (PSCH) and a first secondary synchronization channel (SSCH) and the second transmission from the second base station comprises a second PSCH and a second SSCH;

re-constructing a signal component in the received signal corresponding to one of: (a) a PSCH transmitted from the first base station; and (b) a SSCH transmitted from the first base station;

wherein the reconstructing the signal component in the received signal includes processing the SSCH sequence associated with the SSCH transmitted from the first base station;

subtracting the re-constructed signal component from the received signal to obtain a residual received signal; and determining an identifier associated with at least one of the second PSCH and the second SSCH from the second base station based on processing of the residual received signal.

15. The method of claim 14, further comprising:

receiving a signal from the second base station including the transmission of a cell-specific reference signal (CRS) from the second base station;

estimating a reference signal received power (RSRP) associated with the second base station based on the received signal.

16. The method of claim 15, further comprising:

sending a measurement report to a third base station, wherein the third base station is a serving base station and the measurement report includes the estimated RSRP associated with the second base station.

17. The method of claim 15, further comprising:

comparing the estimated RSRP associated with the second base station to a pre-determined threshold level; and re-selecting to a third base station in response to determining that a criterion associated with the pre-determined threshold level is met.

18. The method of claim 14, further comprising:

determining a physical cell identities (PCID) PCID of the second base station based on a determination of one or more identifier indices associated with the second PSCH and the second SSCH.

19. The method of claim 14, further comprising:

in response to determining that an estimated correlation metric associated with the second base station is above a preset threshold, including identification of the second base.

20. The method of claim 14, further comprising:

in response to receiving an initiating signal from a third base station to initiate subtraction, subtracting the signal component that is re-constructed and is associated with the first base station from the received signal, wherein the third base station is the serving base station.

* * * * *